United States Patent
Yoo et al.

(10) Patent No.: US 9,272,666 B2
(45) Date of Patent: Mar. 1, 2016

(54) COMMUNICATION DEVICE FOR A VEHICLE, ROOM MIRROR STRUCTURE INCLUDED IN THE SAME AND SHADE BAND CONNECTED ELECTRICALLY TO THE ROOM MIRROR STRUCTURE

(75) Inventors: Tae-Hwan Yoo, Seoul (KR);
Chang-Gyu Choi, Incheon-si (KR);
Byong-Nam Kim, Gyeonggi-do (KR)

(73) Assignee: ACE TECHNOLOGIES CORPORATION, Incheon-si (KR)

( * ) Notice: Subject to any disclaimer, the term of this patent is extended or adjusted under 35 U.S.C. 154(b) by 166 days.

(21) Appl. No.: 13/380,353

(22) PCT Filed: Jun. 22, 2010

(86) PCT No.: PCT/KR2010/004052
§ 371 (c)(1),
(2), (4) Date: Dec. 22, 2011

(87) PCT Pub. No.: WO2010/151033
PCT Pub. Date: Dec. 29, 2010

(65) Prior Publication Data
US 2012/0098718 A1    Apr. 26, 2012

(30) Foreign Application Priority Data
Jun. 23, 2009 (KR) .................. 10-2009-0055857

(51) Int. Cl.
*H01Q 1/32* (2006.01)
*B60R 1/12* (2006.01)
*H04B 1/3822* (2015.01)

(52) U.S. Cl.
CPC ................ *B60R 1/12* (2013.01); *H04B 1/3822* (2013.01); *B60R 2001/1261* (2013.01); *B60R 2001/1284* (2013.01); *H01Q 1/3266* (2013.01)

(58) Field of Classification Search
CPC .............. B60R 2001/1284; B60R 2001/1261; B60R 1/12; H04B 1/3822; H01Q 1/3266
USPC ........................................................ 343/713
See application file for complete search history.

(56) References Cited

U.S. PATENT DOCUMENTS

| 5,712,645 A | 1/1998 | Jellum et al. |
| 6,060,151 A * | 5/2000 | Shiraishi et al. ............ 428/209 |
| 2001/0038355 A1 * | 11/2001 | Fuchs et al. ................. 343/713 |
| 2005/0195115 A1 * | 9/2005 | Yegin et al. .................. 343/713 |
| 2009/0128432 A1 * | 5/2009 | Heo ............................. 343/713 |
| 2009/0243824 A1 * | 10/2009 | Peterson et al. ............ 340/435 |
| 2010/0085261 A1 * | 4/2010 | Baranski ..................... 343/713 |

FOREIGN PATENT DOCUMENTS

KR    2009-0052193    5/2009

* cited by examiner

*Primary Examiner* — Hoang V Nguyen
*Assistant Examiner* — Michael Bouizza
(74) *Attorney, Agent, or Firm* — TechLaw LLP (57) ABSTRACT

A communication device for a vehicle in which an RF device in the room mirror is connected electrically to a radiator included in a shade band is disclosed. The communication device for a vehicle includes an RF device in a room mirror and a radiator disposed in a shade band and connected electrically to the RF device.

6 Claims, 8 Drawing Sheets

COMMUNICATION DEVICE FOR A VEHICLE, ROOM MIRROR STRUCTURE INCLUDED IN THE SAME AND SHADE BAND CONNECTED ELECTRICALLY TO THE ROOM MIRROR STRUCTURE

TECHNICAL FIELD

Example embodiment of the present invention relates to a communication device for a vehicle, a room mirror structure included in the same and a shade band connected electrically to the room mirror structure, more particularly relates to a communication device for a vehicle in which an RF device in the room mirror is connected electrically to a radiator included in a shade band.

RELATED ART

Many communication devices such as a radio, a DMB, a navigation, etc. exist in a vehicle, and thus it is necessary to set antennas for the communication devices. Accordingly, antennas are established inside and outside of the vehicle.

The antenna inside of the vehicle includes a sticker type film antenna or a glass antenna established on a window of the vehicle, etc., and the antenna outside of the vehicle has a shark antenna, etc.

In recent, the number of the communication devices in the vehicle has increased rapidly, and thus more many antennas are required. It is limited to establish many antennas to the vehicle due to limited space of the vehicle. Specially, the radiator should have adequate length to realize a low frequency band such as AM/FM bands, etc., but it is difficult to guarantee really the length of the radiator due to the limited space of the vehicle. Hence, the problem exists in that a frequency band for an AM service is not realized adequately in a foreign country when the AM service is provided.

Accordingly, it is necessary to use existing elements in the vehicle to enhance utility of the space, specially a method of guaranteeing adequately length of the radiator has been required.

DISCLOSURE

Technical Problem

Example embodiment of the present invention provides a communication device for a vehicle comprising: an RF device in a room mirror; and a radiator disposed in a shade band and connected electrically to the RF device.

The communication device further includes a circuit board; and a connection member configured to connect electrically the circuit board to a feeding point formed in the shade band. Here, the RF device and the circuit board are connected through a cable, and a power is fed to the radiator from the RF device through the feeding point.

The connection member is connected electrically to the feeding point with contact plate type, pogo pin type or helical spring type.

The communication device further includes a supporting member configured to support the room mirror; and a combination member combined with the supporting member and the shade band. Here, the circuit board locates in the combination member, and the cable is connected to the circuit board in the combination member through the supporting member.

The radiator and shade elements crossing over the radiator exist in the shade band, and the radiator and the shade elements form mesh structure.

The shade band is formed on a glass of the vehicle through a printing method.

The shade band is independently produced, and is adhered to a glass of the vehicle.

A power is supplied to the RF device, and some of the power is fed to the radiator from the RF device.

Another embodiment of the present invention provides a shade band comprising: a feeding point; and a radiator connected electrically to the feeding point. Here, the feeding point and the radiator are included in the shade band, and the feeding point is connected electrically to an RF device in a room mirror.

The shade band further includes shade elements crossing over the radiator. Here, the radiator and the shade elements form mesh structure.

Still another embodiment of the present invention provides A room mirror structure comprising: a room mirror including an RF device; a supporting member configured to support the room mirror; and a combination member combined with the supporting member and a shade band. Here, the shade band includes a radiator, and the RF device in the room mirror is connected electrically to the radiator.

A circuit board is included in the combination member. Here, the circuit board is connected electrically to the RF device in the room mirror through a cable passing through the supporting member, and is connected electrically to a feeding point formed in the shade band through a connection member.

The connection member is connected electrically to the feeding point with contact plate type, pogo pin type or helical spring type.

Technical Solution

A prism sheet according to one example embodiment of the present invention includes a prism base; and first prism patterns disposed on a first surface of surfaces of the prism base, and configured to have a mountain shape. Here, when halving a vertex angle of at least one of the first prism patterns on the basis of a normal of the prism base, sub-angles generated by the halving the vertex angle have substantially the same magnitude.

Advantageous Effects

An RF device of a communication device for a vehicle according to the present invention locates in a room mirror, and a radiator for the RF device is formed in a shade band. As a result, multi-band may be realized with utilizing maximally space of the vehicle.

In addition, since the radiator and shade elements in the shade band form mesh structure, the shade band may perform its original function for blocking sunlight.

Moreover, the shade band including the radiator may not be formed directly on a glass of the vehicle but be adhered on the glass as after-service after it is produced independently, and so utilization of the shade band may increase.

BRIEF DESCRIPTION OF DRAWINGS

Example embodiments of the present invention will become more apparent by describing in detail example embodiments of the present invention with reference to the accompanying drawings, in which.

DETAILED DESCRIPTION

Hereinafter, embodiments of the present invention will be described in detail with reference to accompanying drawings.

Figure 1:
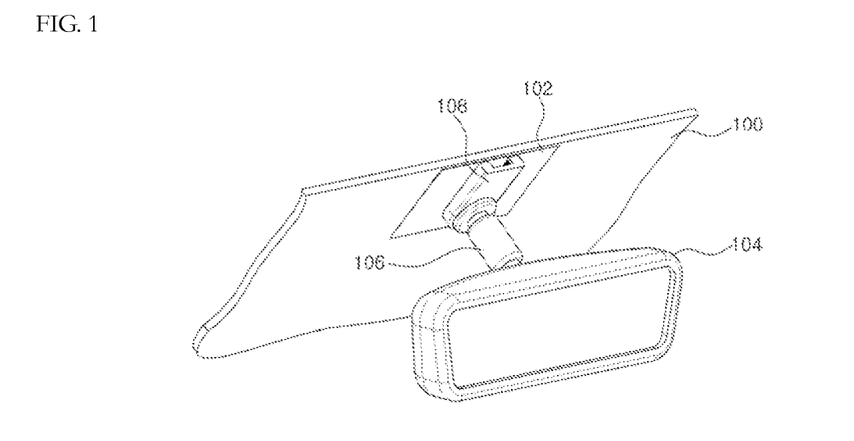
FIG. 1 is a perspective view illustrating schematically structure of a vehicle according to one example embodiment of the present invention.

FIG. 1 is a perspective view illustrating schematically structure of a vehicle according to one example embodiment of the present invention.

As shown in FIG. 1, a shade band 102 is formed on a front glass 100 of a vehicle, and a room mirror 104 combines with the shade band 102.

The shade band 102 is formed usually on an upper part of the glass 100 to block direct sunlight.

In one embodiment of the present invention, the shade band 102 may include at least one radiator and shade elements as described below. That is, the shade band 102 may operate as an antenna, e.g. functions as an antenna for an RF device in the room mirror 104 as described below, and is connected electrically to the RF device.

The radiator is a conductor, and may be realized with various structures such as meander shape, etc. Specially, the radiator functions as the antenna for the RF device, and outputs a radiation pattern when a power is fed to the radiator from the RF device.

The shade elements as nonconductor cross over the radiator, and preferably form the mesh structure with the radiator.

In case that the shade band 102 is formed with the mesh structure, the shade band 102 may perform original function for blocking direct sunlight.

That is, the shade band 102 performs the original function for blocking sunlight and functions also as an antenna for specific device. Structure of the shade band 102 is not limited, but may be variously modified as described below.

Now referring to FIG. 1, the room mirror 104 may combine with the shade band 102 through a supporting member 106 and a combination member 108.

The supporting member 106 combines with a back side of the room mirror 104 as shown in FIG. 1 to support the room mirror 104, and functions as a path through which a cable passes as described below.

The combination member 108 combines the supporting member 106 with the shade band 102. Here, the combination member 108 may be combined with the shade band 102 through adhesion and so on.

In brief, the room mirror 104 is combined with the shade band 102 through the supporting member 106 and the combination member 108. In this case, the RF device included in the room mirror 104 is connected electrically to the shade band 102 for functioning as a radiator.

The room mirror 104, the supporting member 106 and the combination member 108 may be manufactured individually, but be manufactured with one body. Hereinafter, an element including the room mirror 104, the supporting member 106 and the combination member 108 is referred to as a room mirror structure.

In FIG. 1, the room mirror structure combines with only the shade band 102. As a result, the room mirror structure may not be fixed stably to the vehicle. Accordingly, the vehicle may further include extra fixing element for fixing stably the room mirror 104 to for example internal surface of a roof under the condition that the room mirror structure combines with the shade band 102.

Hereinafter, the communication device employed in the vehicle according to one embodiment of the present invention will be described in detail.

Figure 2:
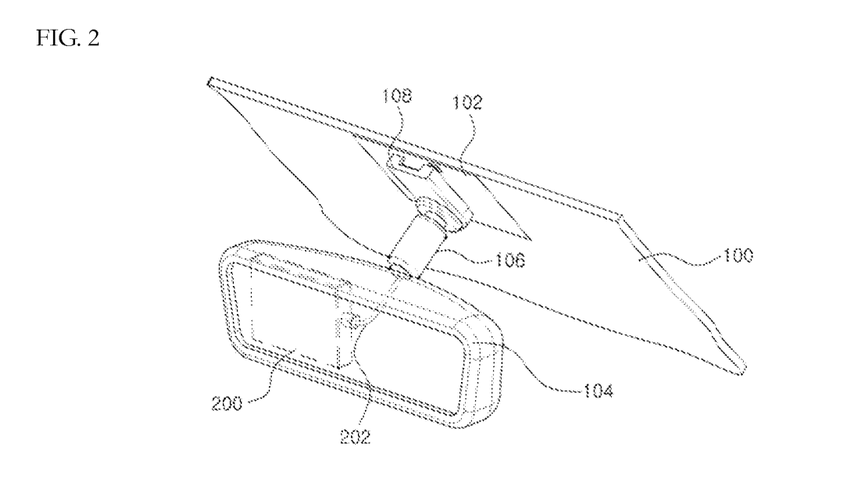
FIG. 2 is a perspective view illustrating schematically a communication device for a vehicle according to one embodiment of the present invention.

FIG. 2 is a perspective view illustrating schematically a communication device for a vehicle according to one embodiment of the present invention.

In FIG. 2, the communication device of the present embodiment includes an RF device 200 and a radiator formed in the shade band 102.

The RF device 200 performs RF communication as a device such as a TDMB module, etc., and is included in the room mirror 104. Since much space exists generally in the room mirror 104, the RF device 200 may be included adequately in the room mirror 104. Other devices except the RF device 200 or antennas may be included in the room mirror 104 or be formed on an internal surface or an outer surface of the room mirror 104. Here, the RF device 200 is not limited as long as it performs RF communication, and may be for example a hi-pass device, the TDMB module, etc.

One RF device 200 is included in the room mirror 104 in FIG. 2, but plural RF devices may be included in the room mirror 104. In another embodiment of the present invention, some of the RF devices are included in the room mirror 104, and the other RF devices may combine with outer surface, e.g. back side of the room mirror 104.

On the other hand, since many communication devices are established to the vehicle, many antennas for servicing multiband should be set to the vehicle. In reality, antennas for realizing multi-band are established inside/outside the room mirror 104.

However, the number of the antennas for the communication devices is insufficient, and thus the present invention embodies additionally the radiator in the shade band 102 to realize the multi-band.

Specially, the radiator should have adequate length for the purpose of achieving low frequency band of FM/AM, etc., but it is difficult to guarantee adequate length of the radiator due to limited space of the room mirror 104. Accordingly, the present invention locates the RF device 200 in the room mirror 104 and forms the radiator in the shade band 102 to guarantee adequate length. As a result, the communication device may provide stably a low frequency band service.

Now referring to FIG. 2, the RF device 200 is connected electrically to the radiator in the shade band 102.

In one embodiment of the present invention, the RF device 200 may be connected electrically to the radiator of the shade band 102 through a cable 202. Here, the cable 202 is connected to a circuit board in the combination member 108 through the supporting member 106, and the circuit board may be connected electrically to the radiator of the shade band 102 through a connection member.

In short, the RF device 200 included in the room mirror 104 is connected electrically to the radiator of the shade band 102 through the cable 202 passing through the supporting member 106. A power is fed to the radiator from the RF device 200, and so the radiator outputs a radiation pattern. Particularly, the power is supplied to the RF device 200 from a battery of the vehicle, and the RF device 200 provides some of the supplied power to the radiator.

Consequently, the present invention may utilize maximally space of the vehicle and realize also multi-band. Specially, the communication device may provide easily the low frequency band service.

In the above description, the RF device 200 is included in the room mirror 104. However, the RF device 200 may combine with the back side, etc. of the room mirror 104. That is, structure of the communication device may be variously modified as long as the RF device 200 included in the room mirror 104 or combined with the outer surface of the room mirror 104 is connected electrically to the radiator of the shade band 102.

Additionally, the RF device 200 is connected to the circuit board in the combination member 108 through the cable 202, but various elements for enabling to transmit an RF signal except the cable 202 may be used to connect electrically the RF device 200 to the radiator of the shade band 102.

Hereinafter, various methods of embodying the radiator in the shade band 102 will be described in detail with reference to accompanying drawings.

Figure 3:
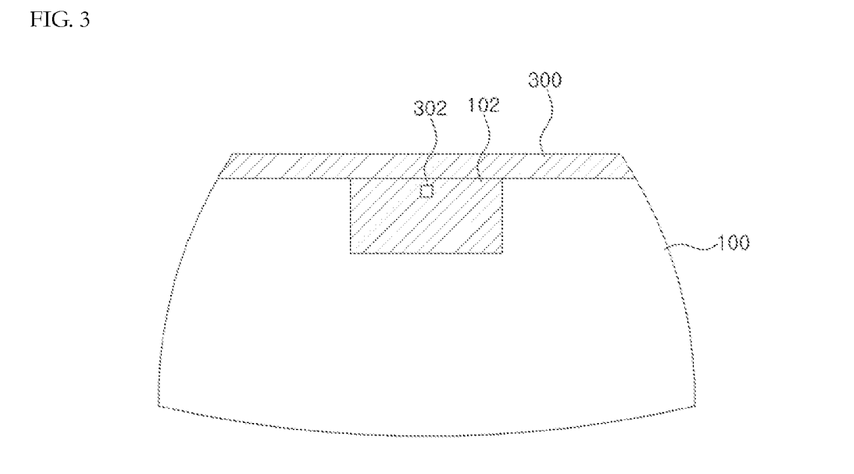
FIG. 3 is a view illustrating schematically a shade band of the vehicle according to one embodiment of the present invention.
Figure 4:
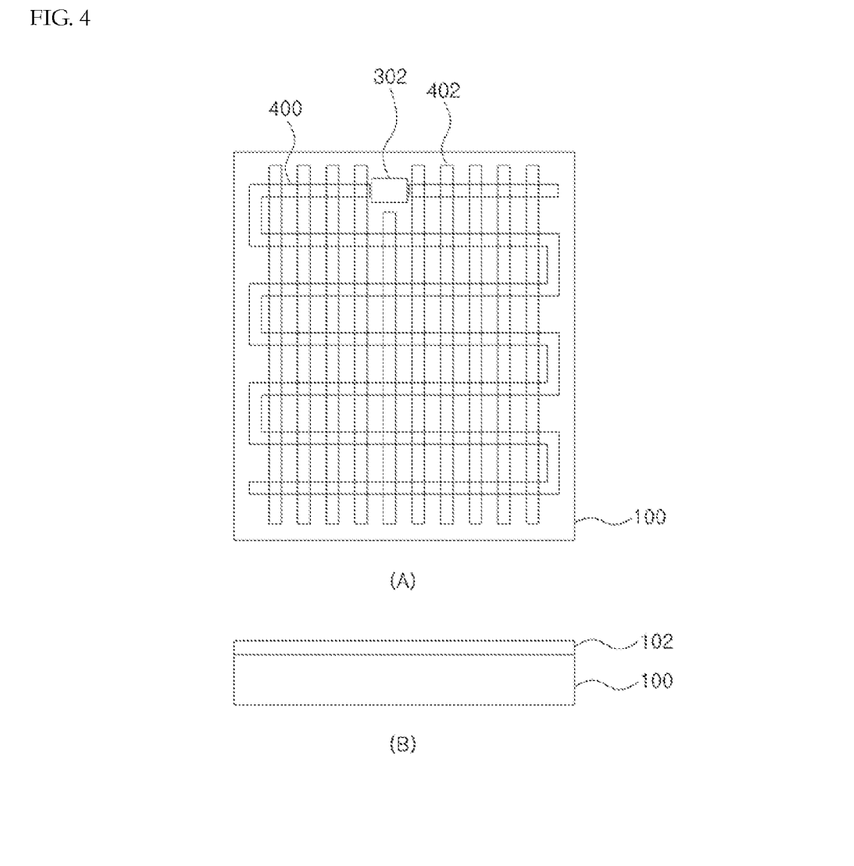
FIG. 4 is a view illustrating structure of the shade band according to a first embodiment of the present invention.

FIG. 3 is a view illustrating schematically a shade band of the vehicle according to one embodiment of the present invention, and FIG. 4 is a view illustrating structure of the shade band according to a first embodiment of the present invention.

As shown in FIG. 3, a first shade band 300 disposed in parallel on an upper part of the front glass 100 of the vehicle and a second shade band 102 disposed on an area by which the room mirror 104 is not shown outside may exist. It is desirable that a feeding point 302 connected electrically to the RF device 200 in the room mirror 104 locates in the second shade band 102.

The first shade band 300 may include at least one radiator, which is not shown.

In other words, since each of the shade bands 102 and 300 includes one or more radiator, multi-band may be realized by the shade bands 102 and 300. In another embodiment, one radiator may be formed on the shade bands 102 and 300 with adequate length, and thus it is proper to achieve the low frequency band such as AM/FM band, etc.

Hereinafter, structure of the radiator in the shade band 102 or 300 will be described in detail. However, it is assumed that the radiator connected electrically to the RF device 200 is formed in the shade band 102 for the purpose of convenience of description.

FIG. 4 is a view illustrating schematically a shade band according to a first embodiment of the present invention.

In FIG. 4(A), the shade band 102 of the present embodiment is formed on an outer surface or an internal surface of the glass 100, and includes a radiator 400, shade elements 402 and a feeding point 302.

In one embodiment of the present invention, the shade band 102, i.e. the radiator 400 and the shade elements 402 may be formed on the glass 100 as shown in FIG. 4(B) through a pad printing method using a pad as print medium or a silk screen printing method, etc. In this case, since the shade band 102 is formed through one printing process, it is simple to form the shade band 102.

In another embodiment of the present invention, the shade band 102 may be produced as extra member and then be adhered to the glass 100 of the vehicle as an after service.

The radiator 400 as a conductor may be made up of copper, and be embodied with meander shape as shown in FIG. 4(A). However, the structure of the radiator 400 is not limited as the meander shape.

The shade elements 402 as nonconductor cross over the radiator 400, and preferably form mesh structure with the radiator 400.

In case that the radiator 400 and the shade elements 402 form the mesh structure, the shade band 102 may perform original function of blocking efficiently direct sunlight. In addition, since the shade band 102 includes the radiator 400, the radiator outputs a radiation pattern having specific frequency band when a power is fed to the radiator 400 through the feeding point 302.

The feeding point 302 is connected electrically to the RF device 200 in the room mirror 104, and the power is fed to the radiator 400 from the RF device 200 through the feeding point 302. Here, position of the feeding point 302 is not limited, i.e. may be variously changed as long as the feeding point 302 is connected electrically to the RF device 200 and delivers the power into the radiator 400. Moreover, the feeding point 302 may be directly connected to the radiator 400 to deliver the power or deliver the power to the radiator 400 through a coupling method.

In above description, the shade band 102 includes one radiator. However, the shade band 102 may include plural radiators. In this case, a power is fed to one radiator from the RF device 200 or a power provided through a cable is fed to other radiator under the condition that an internal conductor of the cable extending in the vehicle is connected electrically to the other radiator. Specially, since a cable may be connected to a hi-pass device, etc. under the condition that the hi-pass device, etc. combines with the room mirror 104, the feeding to the radiator 400 may be achieved through the cable.

In brief, the shade band 102 of the present invention provides original function of blocking sunlight and functions also as the antenna. Specially, the radiator 400 of the shade band 102 is connected electrically to the RF device 200 in the room mirror 104 and so it functions as the antenna for the RF device 200.

Moreover, the radiator 400 and the shade elements 402 form fine mesh structure, and thus the shade band 102 may block efficiently direct sunlight. However, the radiator 400 and the shade elements 402 may have different structure from the mesh structure as long as they block the sunlight. The radiator 400 may also be variously modified without limited as the meander shape.

FIG. 4 shows only the second shade band 102 of the shade bands 300 and 102, but the first shade band 300 may be embodied with a structure similar to the second shade band 102. Additionally, the RF device 200 may be connected electrically to a radiator of the first shade band 300.

In the above description, the radiator 400 and the shade elements 402 are formed directly on the glass 100 through for example the printing method. However, the radiator 400 and the shade elements 402 may be disposed on a substrate or a film formed on the glass 100. In this case, the shade band 102 or 300 may be formed in advance on the vehicle when the vehicle is produced or be adhered to the vehicle as after service after the vehicle is produced.

Hereinafter, connection structure between the RF device 200 in the room mirror 104 and the feeding point 302 will be described in detail.

Figure 5:
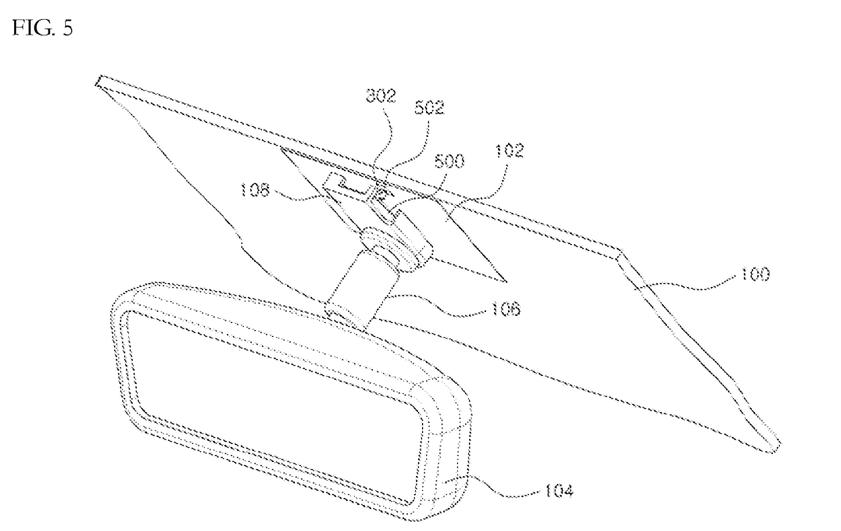
FIG. 5 is a perspective view illustrating connection structure of an RF device and a feeding point according to a first embodiment of the present invention.

FIG. 5 is a perspective view illustrating connection structure of an RF device and a feeding point according to a first embodiment of the present invention.

In FIG. 5, the RF device 200 is included in the room mirror 104, and the cable 202 is connected to a circuit board 500 in the combination member 108 through the supporting member 106 under the condition that it is connected to the RF device 200.

Contact plate type of a connection member 502 is connected to the circuit board 500, and it is connected electrically to the feeding point 302 of the shade band 102. As a result, a power is provided to the feeding point 302 from the RF device 200 through the cable 202, the circuit board 500 and the connection member 502.

The connection member 502 is a conductor, and may be connected to the feeding point 302 through area contact under the condition that it is connected to the circuit board 500.

The connection structure between the connection member 502 and the circuit board 500 and the connection structure of the connection member 502 and the feeding point 302 may be variously modified as long as the connection member 502 is connected electrically to the circuit board 500 and the feeding point 302.

Figure 6:
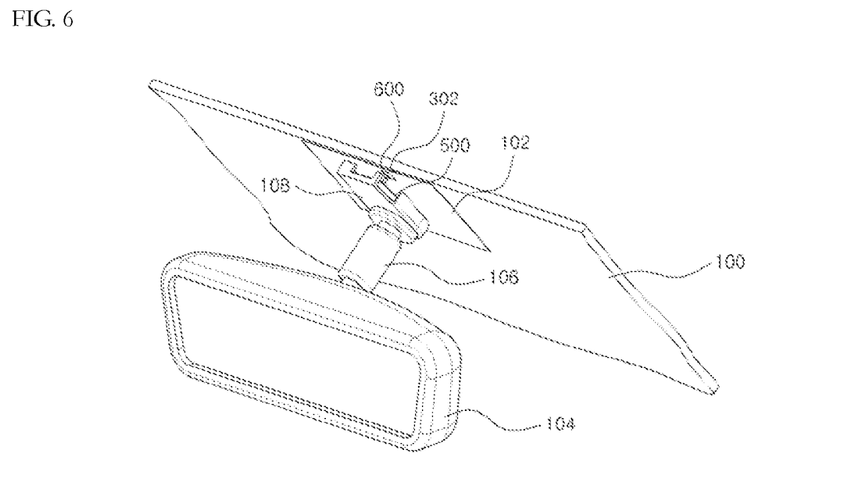
FIG. 6 is a perspective view illustrating connection structure of an RF device and a feeding point according to a second embodiment of the present invention.

FIG. 6 is a perspective view illustrating connection structure of an RF device and a feeding point according to a second embodiment of the present invention.

In FIG. 6, the circuit board 500 and the feeding point 302 may be connected through pogo pin type of a connection member 600. That is, the connection member 600 is connected to the feeding point 302 in point contact.

Figure 7:
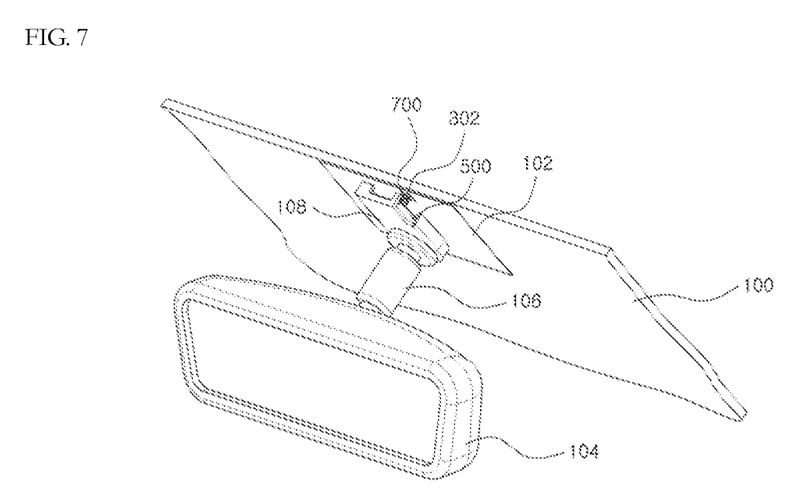
FIG. 7 is a perspective view illustrating connection structure between an RF device and a feeding point according to a third embodiment of the present invention.

FIG. 7 is a perspective view illustrating connection structure between an RF device and a feeding point according to a third embodiment of the present invention.

In FIG. 7, the circuit board 500 and the feeding point 302 may be connected electrically through helical spring type of a connection member 700. In this case, the present invention may guarantee adequate electrical length for the RF device.

The cable 202 connected to the RF device 200 may not contact with the circuit board 500 but be connected directly to the feeding point 302, which is not shown in FIG. 5 to FIG. 7.

On the other hand, the circuit board 500 and the feeding point 302 may be connected electrically through various connection structures not the above structures.

Figure 8:
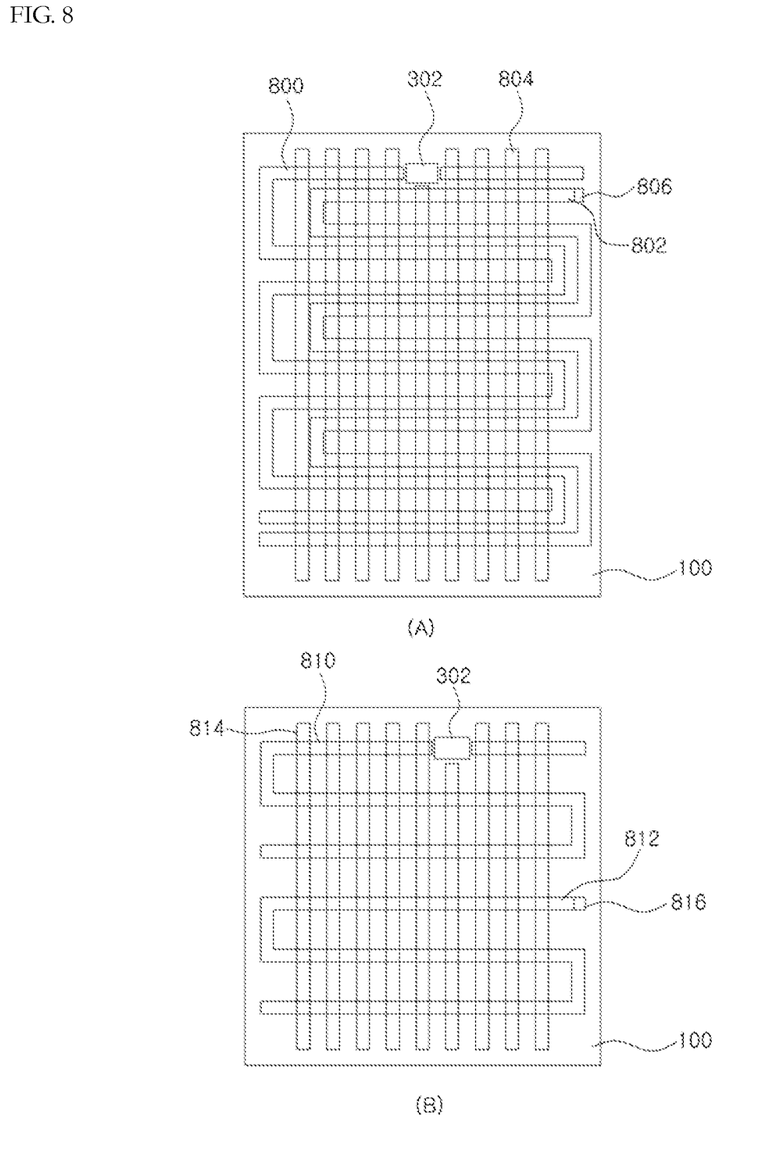
FIG. 8 is a view illustrating a shade band according to a second embodiment of the present invention.

FIG. 8 is a view illustrating a shade band according to a second embodiment of the present invention.

In FIG. 8(A), the shade band 102 of the present embodiment includes a first radiator 800, a second radiator 802, shade elements 804 and a feeding point 302.

The second radiator 802 is disposed with meander shape along the first radiator 800, and the radiators 800 and 802 may form mesh structure with the shade elements 804.

A power is fed to the first radiator 800 through the feeding point 302, i.e. is provided to the first radiator 800 from the RF device 200, and so the first radiator 800 outputs radiation pattern.

A power may be fed to the second radiator 802 through new feeding point 806. For example, an internal conductor of a cable extending in the vehicle is connected electrically to the feeding point 806, and the power may be fed to the second radiator 802 from internal element of the vehicle through the feeding point 806. However, a power may be provided from the RF device 200 to the second radiator 802 through the feeding point 302.

In FIG. 8(B), the shade band 102 of the present embodiment may include a first radiator 810, a second radiator 812, shade elements 814 and a feeding point 302.

The second radiator 812 may locate in parallel to the first radiator 810 under the condition that it separates from the first radiator 810. The radiators 810 and 812 may form mesh structure with the shade elements 814.

In short, the shade band 102 of the present embodiment includes two or more radiators. Here, each of the radiators may realize different frequency band, and thus the shade band 102 may realize multi-band. At least one of the radiators may be connected electrically to the RF device 200 to function as the antenna of the RF device 200.

Two structures of the radiators are shown in the above description, but the structure of the radiators may be variously modified without limited.

Figure 9:
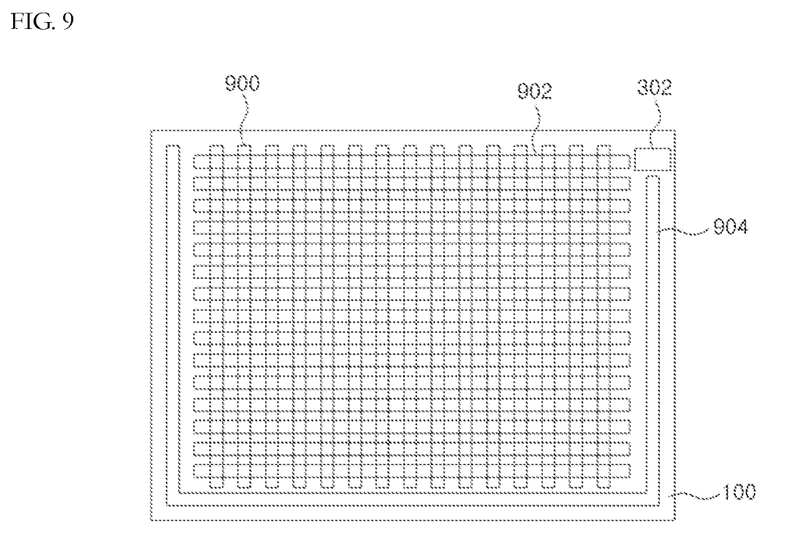
FIG. 9 is a view illustrating a shade band according to a third embodiment of the present invention.

FIG. 9 is a view illustrating a shade band according to a third embodiment of the present invention.

In FIG. 9, the shade band 102 of the present embodiment includes first shade elements 900, second shade elements 902, a radiator 904 and a feeding point 302.

The first shade elements 900 and the second shade elements 902 form mesh structure to block sunlight.

The radiator 904 is disposed outside of an area in which the shade elements 900 and 902 locate, i.e. is separated electrically from the shade elements 900 and 902. Here, the radiator 904 may be connected electrically to the feeding point 302, and thus a power is fed to the radiator 904 from the RF device 200 through the feeding point 302.

In brief, in the shade band 102 of the present embodiment unlike the other embodiments, the radiator 904 does not cross over the shade elements 900 and 902. The shade elements 900 and 902 and the radiator 904 may be formed through the printing method.

The shade elements 900 and 902 form the mesh structure in the above description, but another radiator not the radiator 904 may form mesh structure with the shade elements 900 or 902. In this case, the shade band 102 realize multi-band.

Figure 10:
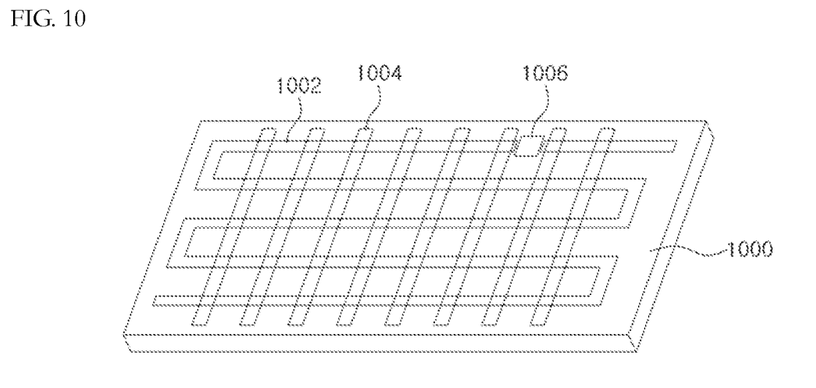
FIG. 10 is a view illustrating a shade band according to a fourth embodiment of the present invention.

FIG. 10 is a view illustrating a shade band according to a fourth embodiment of the present invention.

In FIG. 10, the shade band 102 of the present embodiment is an independent member adhered to the glass 100, and includes a substrate 1000, a radiator 1002, shade elements 1004 and a feeding point 1006.

The substrate 1000 may be an FPCB, an FR4 and so on, or be a film. In other words, the substrate 1000 may be any one of the circuit board and the film.

The radiator 1002 is disposed with for example meander type on the substrate 1000.

The shade elements 1004 crosses over the radiator 1002, preferably cross vertically over the radiator 1002, thereby forming mesh structure.

The feeding point 1006 is connected electrically to the RF device 200 in the room mirror 104.

In short, the shade band 102 of the present embodiment is not directly formed on the glass 100 but may be adhered to the internal surface of the glass 100 as after service after it is independently produced unlike in the other embodiments. However, the room mirror 104 may combine with the shade band 102 under the condition that the shade band 102 is adhered to the glass 100.

Disposition and structure of the radiator and the shade elements in the shade band 102 are not limited as those in FIG.

10, and disposition and structure in the other embodiments may be applied to the shade band 102 of the present embodiment.

Figure 11:
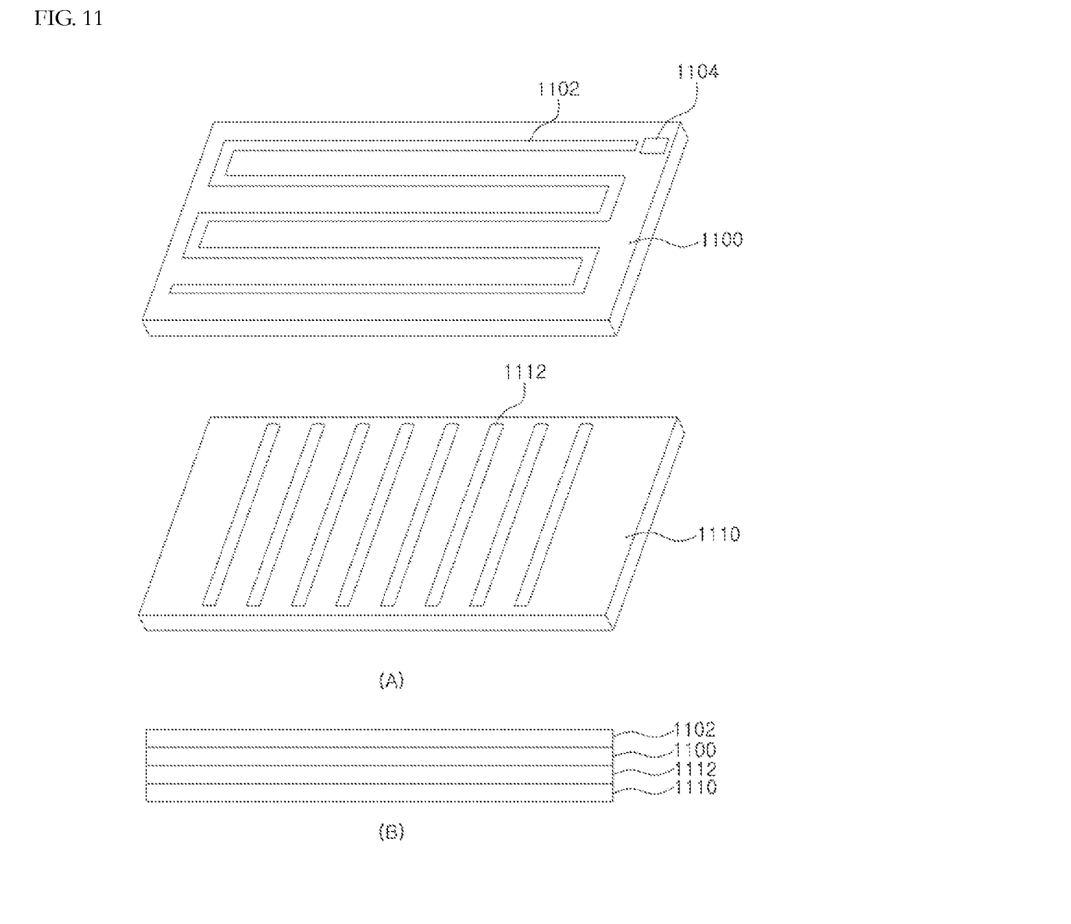
FIG. 11 is a view illustrating a shade band according to a fifth embodiment of the present invention.

FIG. 11 is a view illustrating a shade band according to a fifth embodiment of the present invention.

In FIG. 11, the shade band 102 of the present invention includes a first substrate 1100, a radiator 1102, a feeding point 1104, a second substrate 1110 and shade elements 1112.

That is, the radiator and the shade elements exist on the same plane in the other embodiments, but the radiator 1102 and the shade elements 1112 exist on different planes in the shade band 102 of the present embodiment. Particularly, the radiator 1102 is disposed on the first substrate 1100 as shown in FIG. 11(A), and the shade elements 1112 locate on the second substrate 1110. The first substrate 1100 may locate on the second substrate 1110 as shown in FIG. 11(B). In another embodiment, the second substrate 1110 may be disposed on the first substrate 1100.

The radiator 1102 and the shade elements 1112 form for example mesh structure to function as a shade band, and the feeding point 1104 is connected electrically to the RF device 200 in the room mirror 104.

Figure 12:
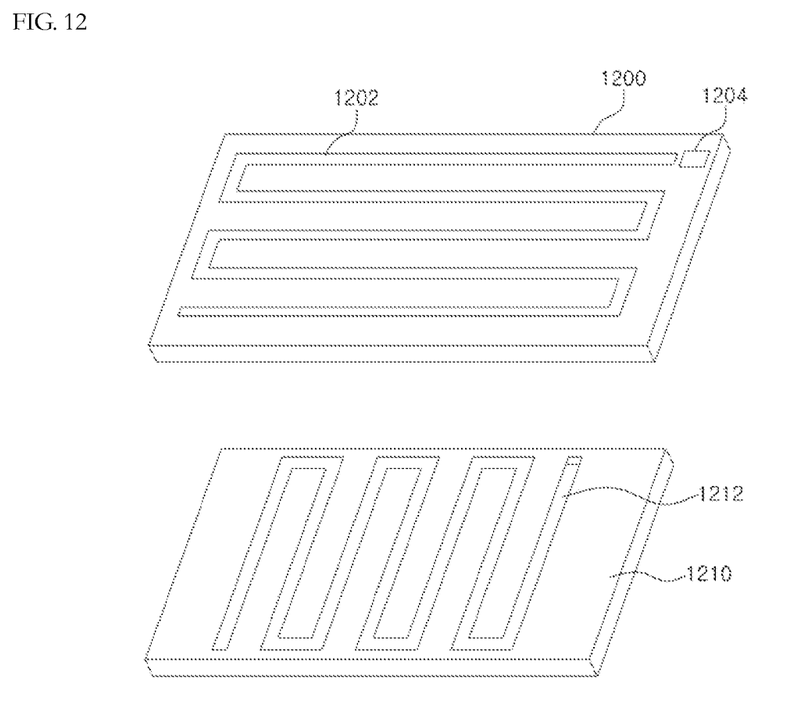
FIG. 12 is a view illustrating a shade band according to a sixth embodiment of the present invention.

FIG. 12 is a view illustrating a shade band according to a sixth embodiment of the present invention.

In FIG. 12, the shade band 102 of the present embodiment includes a first substrate 1200, a first radiator 1202, a first feeding point 1204, a second substrate 1210 and a second radiator 1212.

In other words, the shade band 102 of the present embodiment has a structure similar to the fifth embodiment, but the second radiator 1212 is formed on the second substrate 1210 unlike the fifth embodiment.

In brief, the shade band 102 of the present embodiment may be formed directly on the glass 100, and may be adhered to the glass 100 after it is independently produced.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A communication device for a vehicle comprising: an RF device in a room mirror; and
   a shade band comprising a combination of a conductive radiator for radiating an RF signal and nonconductor shade elements for at least partially blocking direct sunlight, the radiator being connected electrically to the RF device, wherein the radiator crosses over the nonconductor shade elements and the shade band is coupled to a windshield of the vehicle.

2. The communication device of claim 1, further comprising:
   a board where circuits for controlling the radiator are formed; and
   a connection member configured to connect electrically the board to a feeding point formed in the shade band,
   wherein the RF device and the board are connected through a cable, and a power is fed to the radiator from the RF device through the feeding point.

3. The communication device of claim 2, wherein the connection member is connected electrically to the feeding point through a contact plate type, a pogo pin or a helical spring.

4. The communication device of claim 2, further comprising:
   a supporting member configured to support the room mirror; and
   a combination member combined with the supporting member and the shade band,
   wherein the cable is connected to the board in the combination member through the supporting member.

5. The communication device of claim 1, wherein the shade band is formed on a glass of the vehicle through a printing method.

6. The communication device of claim 1, wherein the shade band is adhered to a glass of the vehicle.

* * * * *